United States Patent [19]

Yazaki et al.

[11] Patent Number: 4,478,735

[45] Date of Patent: Oct. 23, 1984

[54] PROCESS FOR PRODUCING GRANULAR DETERGENT COMPOSITION

[75] Inventors: Mitsuyoshi Yazaki; Hideo Tanaka; Masayoshi Nakamura, all of Chiba, Japan

[73] Assignee: Lion Corporation, Tokyo, Japan

[21] Appl. No.: 376,963

[22] Filed: May 11, 1982

[30] Foreign Application Priority Data

May 20, 1981 [JP] Japan ................................ 56-76086

[51] Int. Cl.[3] .......................... C11D 3/04; B01D 1/16

[52] U.S. Cl. ...................................... 252/135; 34/168; 159/3; 159/16 R; 159/DIG. 14; 252/140

[58] Field of Search .................. 252/140, 174.25, 135; 159/DIG. 14, 4 CC, 3, 16 R; 34/168

[56] References Cited

U.S. PATENT DOCUMENTS 3,629,951 12/1971 Davis et al. ............ 159/DIG. 14 X 4,362,640 12/1982 Schreiber .................. 252/174.14 X

*Primary Examiner*—John E. Kittle

*Assistant Examiner*—Mukund J. Shah

*Attorney, Agent, or Firm*—Armstrong, Nikaido, Marmelstein & Kubovcik

[57] ABSTRACT

A process for producing a granular detergent composition containing a surface active agent, a zeolite, an alkali metal silicate, and other detergent builder is described. This granular detergent composition is produced by either (1)

(a) preparing an aqueous slurry containing, as a dispersing medium, the surface active agent;

(b) bubbling a gas into the aqueous slurry to form a slurry containing bubbles having an average bubble diameter of 40 through 100 microns and having a specific gravity of 0.7 through 0.9;

(c) mixing the resultant aqueous slurry with the zeolite, the alkali metal silicate, and the other builders to form a detergent slurry; and (d) spray drying the detergent slurry to form the granular detergent composition or (2)

(a) preparing a detergent slurry containing the surface active agent, the zeolite, the alkali metal silicate, and/or other detergent builders;

(b) passing the detergent slurry through a centrifugal pump, while a gas is bubbled into the detergent slurry, whereby the detergent slurry containing bubbles having an average diameter of 40 through 100 microns and having a specific gravity of 0.7 through 0.9 is formed; and (c) spray drying the detergent slurry to form the granular detergent composition.

4 Claims, No Drawings

PROCESS FOR PRODUCING GRANULAR DETERGENT COMPOSITION

BACKGROUND OF THE INVENTION

1. Field of the Invention

The present invention relates to a process for producing a granular (or powdered) detergent composition containing a relatively large amount of a zeolite. More specifically, it relates to a process for producing a granular detergent composition having a small bulk density despite a relatively large content of a zeolite.

2. Description of the Prior Art

Phosphates have been widely used as builder components for granular (or powdered) detergent compositions. However, the use of phosphates in detergent compositions has been recently restricted from the viewpoint of pollution. For this reason, various attempts have been made in the art to develop a new detergent builder component to take the place of phosphates. For instance, alkali builders such as silicates and carbonates and organic builders such as citrates have been proposed as new builders, and detergent compositions containing the same have been developed. However, these compositions have disadvantages in that the detergency or detergent power thereof is not sufficient in water having a high hardness, although these compositions exhibit an acceptable detergency in water having a low hardness.

It is known in the art, as disclosed in British Pat. Nos. 1473201, 1473202, 1429143 and 1498492 that a zeolite (i.e., an aluminosilicate) is capable of capturing a Ca ion in hard water and, therefore, renders a detergent composition effective even in hard water. The zeolite is a builder having an excellent capability to soften hard water. However, granular detergent compositions containing zeolite, especially containing 10% by weight or more of zeolite, have a large bulk density.

It is known that the bulk density of a household granular detergent composition is one of the most important factors affecting the purchasing preference of consumers. This is because consumers tend to judge the amount of a detergent composition by volume rather than weight and because a detergent composition having a large bulk density is deemed to be a small amount as compared with one having a small bulk density, in spite of being the same weight.

Various attempts have been made to decrease the bulk density of granular detergent compositions containing a zeolite. Some known methods are to increase the water content of the detergent composition slurry to be spray dried or to raise the temperature of hot air during the spray drying. However, the former method results in an undesirable drying load due to the increase in water, and the latter method is liable to lower the quality of the detergent composition due to the high temperature exposure.

Furthermore, it is known in the production of granular detergent compositions containing a relatively large amount of a phosphate but no zeolite that a gas such as air can be previously introduced or bubbled into the detergent slurry to be spray dried so as to control the bulk density of the granular detergent composition thus obtained (see U.S. Pat. Nos. 3,629,951 and 3,629,955, Japanese Patent Application Laid-Open (Kokai) No. 52-133166. However, it has been confirmed that simple application of this method to the production of a detergent composition containing a zeolite and a small amount of a phosphate results in undesirable free flowability and compressive hardening resistance unless the amount of the detergent slurry sprayed per hour is remarkably decreased, although the bulk density per se of the resultant granular detergent composition can be controlled.

SUMMARY OF THE INVENTION

Accordingly, the objects of the present invention are to eliminate the above-mentioned disadvantages of the prior art and to provide a process for producing a granular detergent composition containing a relatively large amount of a zeolite and having a small bulk density and excellent free flowability, and compressive hardening resistance, without decreasing the amount of detergent slurry sprayed per hour.

Other objects and advantages of the present invention will be apparent from the following description.

In accordance with the first aspect of the present invention, there is provided a process for producing a granular detergent composition containing a surface active agent, a zeolite, an alkali metal silicate, and other detergent builders, the content of the zeolite being 10% through 25% by weight on a dry weight basis, comprising the steps of:

(a) preparing an aqueous slurry containing, as a dispersing medium, the surface active agent;
(b) bubbling a gas into the aqueous slurry to form a slurry containing bubbles having an average bubble diameter of 40 through 100 microns and having a specific gravity of 0.7 through 0.9;
(c) mixing the resultant aqueous slurry with the zeolite, the alkali metal silicate, and other builders to form a detergent slurry; and
(d) spray drying the detergent slurry to form the granular detergent composition.

In accordance with the second aspect of the present invention, there is provided a process for producing a granular detergent composition containing a surface active agent, a zeolite, an alkali metal silicate and other detergent builders, the content of the zeolite being 10% through 25% by weight on a dry weight basis, comprising the steps of:

(a) preparing a detergent slurry containing the surface active agent, the zeolite, the alkali metal silicate, and/or other detergent builders;
(b) passing the detergent slurry through a centrifugal pump, while a gas is bubbled into the detergent slurry, whereby the detergent slurry containing bubbles having an average diameter of 40 through 100 microns and having a specific gravity of 0.7 through 0.9 is formed; and
(c) spray drying the detergent slurry to form the granular detergent composition.

DESCRIPTION OF THE PREFERRED EMBODIMENTS

The surface active agents usable in the present invention include mainly anionic surface active agents and, optionally, nonionic surface active agents and other surface active agents.

Examples of anionic surface active agents are:

(a) Alkylbenzenesulfonates having an alkyl group with 8 through 15 carbon atoms;
(b) Alkylsulfates having an alkyl group with 8 through 18 carbon atoms;

(c) Sulfates of ethoxylated products obtained from the addition of 1 through 8 moles, on average, of ethylene oxide to an alcohol having an alkyl group with 8 through 18 carbon atoms;

(d) Salts of sulfonated products of alpha-olefins having 12 through 22 carbon atoms (mainly composed of mixtures of alkene sulfonates and hydroxyalkane sulfonates);

(e) Salts of sulfonated products of methyl or ethyl esters of fatty acids having 10 through 20 carbon atoms on average;

(f) Alkane sulfonates obtained from paraffins having 12 through 22 carbon atoms;

(g) Salts of higher fatty acids;

(h) Salts of condensates of higher fatty acid salts and taurine (N-acylaminoethane sulfonates); and (i) Salts of dialkyl sulfosuccinate esters.

These salts are desirably in the form of alkali metal salts such as sodium salts and potassium salts. Furhtermore, in the case of the sulfonic acid and sulfate type anionic surface active agents, magnesium salts thereof can also be desirably used. The above-mentioned anionic surface active agents can be used alone or in any mixtures thereof.

Examples of the nonionic surface active agents usable in the present invention are polyoxyethylene alkyl ethers, polyoxyethylene alkylphenol ethers, polyoxyethylene fatty acid esters, sorbitan fatty acid esters, polyoxyethylene ethers, sucrose fatty acid esters, and fatty acid alklol amides. Examples of the amphoteric surface active agents are betaine type amphoteric surface active agents such as lauryldimethylcarboxymethyl ammonium betaine, alanine type amphoteric surface active agents, and imidazoline type amphoteric surface active agents. These nonionic surface active agents and/or amphoteric surface active agents can be used together with the above-mentioned anionic surface active agents.

The surface active agents are incorporated into granular detergent compositions generally in an amount of 10% through 35% by weight, on a dry basis, of the granular detergent compositions.

The zeolites usable in the present invention include natural zeolites and synthetic zeolites such as A-type, X-type, and Y-type zeolites. Of these synthetic zeolites, the A-type zeolites are desirably used.

The average particle diameter of the zeolites is generally 0.5 through 10 microns, desirably 1 through 5 microns. The zeolite is generally incorporated into the granular detergent composition in an amount of 10% through 25% by weight on a dry basis. Zeolite in an amount less than 10% by weight does not cause the above-mentioned serious problems during the bubbling of the gas, which problems should be solved by the present invention. Contrary to this, zeolite in an amount of more than 25% by weight does not result in good granular detergent compositions even by using the present invention. That is, the average diameter of the bubbles in the slurry and the specific gravity of the slurry are difficult to control to the desired values. Or, granular detergent compositions having satisfactory properties cannot be obtained at the spray drying step even if the average diameter of the bubbles and the specific gravity of the slurry can be adjusted to the desired values by bubbling the gas for a sufficient period of time. In extreme cases, the spray drying itself becomes impossible.

The alkali metal silicates usable in the present invention are those having the general formula:

$$M_2O.nSiO_2$$

wherein M is an alkali metal, N=1.8 through 3.4. Examples of the alkali metals are sodium and potassium, desirably sodium. The alkali metal silicates include in the states of solid and liquid. The liquid silicates, which are generally a 37% through 54% by weight aqueous solution, are desirable because of easy handling thereof. The alkali metal silicates are generally incorporated into the granular detergent composition in an amount of 5% through 20% by weight.

The term "other detergent builder" used herein means inorganic and organic builders other than the zeolites and the alkali metal silicates. Examples of inorganic builders are sodium carbonate, sodium tripolyphosphate, sodium pyrophosphate, sodium orthophosphate, and sodium sulfate. However, it should be noted that the amount of the phosphates to be incorporated into the granular detergent composition should be minimized from the viewpoint of pollution. Examples of the organic builders are polycarboxylates (e.g., the salts of maleic anhydride polymers, acrylic acid polymers, or the copolymers thereof with olefins), sodium nitrilotriacetate (NTA), and sodium citrate.

The other detergent builders are generally incorporated into the granular detergent compositions in an amount of 20% through 70% by weight on a dry basis.

As mentioned hereinabove, according to the present invention, the detergent slurry from which the granular detergent composition is produced is achieved by means of spray drying in either of the following methods.

In the first method, an aqueous slurry containing, as a dispersing medium, the surface active agent alone or the surface active agent and the alkali metal silicate together is first prepared. Thereafter, a gas such as air and nitrogen is bubbled into the aqueous slurry. Zeolites and the other detergent builder are mixed with the bubbled aqueous slurry. When only the surface active agent is used as a dispersing medium, the alkali metal silicate is also mixed with the bubbled aqueous slurry at this time. In the first method, the aqueous slurry into which the gas is bubbled has a water content of 45% through 80% by weight, desirably 50% through 70% by weight. It is desirable that no substantial amounts of the zeolite and the other detergent builder be contained in the aqueous slurry. However, the aqueous slurry can contain the zeolite and the other detergent builder in such amounts that the subsequent gas bubbling operation is not adversely affected. The gas bubbled aqueous slurry can be directly mixed with the zeolites and the other detergent builder. However, prior to the mixing with these components, the aqueous slurry is advantageously passed through a centrifugal pump.

According to the second method for preparing the detergent slurry, a detergent slurry containing the surface active agent, the zeolite, the alkali metal silicate, and the other detergent builder is first prepared. Then, the detergent slurry is passed through a centrifugal pump while gas is bubbled through the slurry. In the second method, the water content of the detergent slurry into which the gas is bubbled is generally 30% through 60% by weight, desirably 35% through 50% by weight.

The extent of the above-mentioned gas bubbling into the aqueous slurry or the detergent slurry is important in the present invention. That is, the average diameter of the bubbles formed in the aqueous or detergent slurry must be 40 through 100 microns, desirably 60 through 80 microns, and the specific density of the slurry must be 0.7 through 0.9, desirably 0.75 through 0.85. An average bubble diameter of smaller than 40 microns results in an increase in the viscosity of the slurry, which in turn tends to cause trouble in transfer of the slurry and the spraying. Contrary to this, an average bubble diameter of larger than 100 microns tends to result in the deterioration of the physical properties of the granular detergent composition after spray drying. Furthermore, a specific gravity of the slurry of smaller than 0.7 not only results in an increase in the viscosity of the slurry, which in turn tends to cause trouble in transfer of the slurry and the spraying, but also results in deterioration of the physical properties of the granular detergent compostion produced. Contrary to this, a specific gravity of the slurry of larger than 0.9 does not result in the desired decrease in the bulk density of the granular detergent composition.

The detergent slurry containing the gas bubbles and prepared in the above-mentioned first or second method is then subjected to spray drying in a conventional manner. Thus, a granular detergent composition having a small bulk density is obtained.

The granular detergent composition according to the present invention can contain any conventional ingredients which are optionally contained in conventional granular detergent compositions. Examples of such conventional ingredients are: redeposition preventing agents such as carboxymethyl cellulose (CMC), polyethylene glycol (PEG), and polyvinyl alcohol (PVA); chelating agents such as ethylenediamine tetraacetate (EDTA); anticaking agents such as toluenesulfonates; detergency increasing agents such as enzymes, and optical brightening agents; perfumes; coloring agents; and fluorescent agents. These optional ingredients can be added in any step in the preparation of the detergent slurry according to the present invention.

EXAMPLES

The present invention now will be further illustrated by, but is by no means limited to, the following examples. The average bubble diameter of the slurry, the viscosity of the slurry, the crushing strength of the granular detergent composition, and the particle strength were determined according to the following methods.

(a) Average bubble diameter of slurry

A small amount of the slurry is placed between two sheets of slide glasses in such a manner that the thickness of the slurry is approximately 0.1 through 0.3 mm. The apparent diameter Rr of the bubble is measured by means of a stereo microscope. The actual average bubble diameter Dav is calculated from the following equation.

$$Dav = \left[\left[\frac{\sum_{n=1}^{n}\left\{\frac{4}{3}\pi\cdot\left(\frac{H}{2}\right)^3 + \frac{\pi\cdot H\cdot(Rn-H)\cdot Rn}{4}\right\} + \sum_{m=1}^{m}\frac{\pi}{6}Rm^3}{m+n}\right]\cdot\frac{6}{\pi}\right]^{\frac{1}{3}}$$

wherein

H : Thickness of slurry

Rn: Measured apparent bubble diameter larger than H (i.e. Rr>H)

Rm: Measured apparent bubble diameter not larger than H (i.e. Rr≦H)

n : Number of bubbles of Rr>H m : Number of bubbles of Rr≦H (b) Viscosity of slurry The viscosity of the slurry is measured by means of a Brookfield type viscometer (manufactured by Tokyo Keiki, Model B8H) at a temperature of 70° C. and a rotor revolution speed of 20 rpm.

(c) Compression-caking property

A cylindrical cell having a diameter of 5 cm and a height of 5 cm is filled with a sample at a temperature of 50° C. through 60° C. The sample is compression molded for 3 minutes under a load of 3 kg. The load necessary for crushing the molded cylindrical sample is measured.

(d) Granule strength

Sample granules (or powder particles) are transported by means of an air lift having an adjusted air flow rate of 15 m/sec. The bulk densities before and after the transportation are measured and the difference thereof is calculated.

EXAMPLE 1

Granular detergent compositions were prepared as follows.

An aqueous slurry containing a portion of detergent ingredients as listed in Table 1 below was prepared. Air was bubbled into the aqueous slurry by introducing the air to a circulating line, while the aqueous slurry was circulated under stirring in a mixing vessel provided with the circulating line and an agitator. To the resultant slurry, the remaining detergent ingredients as listed in Table 1 were added and the resultant detergent slurry was spray dried in a hot air type spray drying apparatus. Thus, a granular detergent composition was obtained.

The introduction of air was effected by introducing compressed air into the slurry through a stainless steel perforated plate having a pore diameter of 0.1 through 1 mm and an opening space ratio of 1% and provided at the circulating line.

The ingredients contained in the aqueous slurry, the ingredients added to the aqueous slurry, and the properties of the detergent slurry and the granular detergent compositions are shown in Table 1.

TABLE 1

| | | Run No. | | | | | |
|---|---|---|---|---|---|---|---|
| | | 1* | 2 | 3 | 4* | 5* | 6* |
| Aqueous slurry | Ingredient | All ingredients | AOS—Na LAS—Na | AOS—Na LAS—Na | AOS—Na LAS—Na | AOS—Na LAS—Na | AOS—Na LAS—Na |

TABLE 1-continued

| | | Run No. | | | | | |
|---|---|---|---|---|---|---|---|
| | | 1* | 2 | 3 | 4* | 5* | 6* |
| | | | Sodium citrate<br>PEG | Sodium silicate<br>Sodium citrate<br>PEG | Sodium silicate<br>Sodium citrate<br>PEG<br>Sodium sulfate | Sodium silicate<br>Sodium citrate<br>PEG<br>Sodium carbonate | Sodium silicate<br>Sodium citrate<br>PEG<br>Zeolite |
| | Airbubbling time (min) | 12 | 12 | 12 | 12 | 12 | 12 |
| | Water content (wt %) | 40 | 63 | 59 | 38 | 52 | 58 |
| | Addition ingredient | — | Sodium silicate<br>Sodium carbonate<br>Sodium sulfate<br>Zeolite | Sodium carbonate<br>Sodium sulfate<br>Zeolite | Sodium carbonate<br>Zeolite | Sodium sulfate<br>Zeolite | Sodium carbonate<br>Sodium sulfate |
| Detergent slurry | Specific gravity | 0.95 | 0.87 | 0.83 | 0.97 | 0.97 | 0.95 |
| | Air bubble diameter (μ) | 80 | 80 | 80 | 90 | 90 | 80 |
| | Viscosity (p) | 80 | 100 | 100 | 90 | 90 | 90 |
| | Water (wt %) | 40 | 40 | 40 | 40 | 40 | 40 |
| | Drying capacity (kg/hr) | 3800 | 3800 | 4000 | 3400 | 3400 | 3400 |
| Composition of granular detergent (wt %) | AOS—Na(1) | 10 | 10 | 10 | 10 | 10 | 10 |
| | LAS—Na(2) | 10 | 10 | 10 | 10 | 10 | 10 |
| | Zeolite(3) | 15 | 15 | 15 | 15 | 15 | 15 |
| | Sodium silicate(4) | 10 | 10 | 10 | 10 | 10 | 10 |
| | Sodium carbonate | 10 | 10 | 10 | 10 | 10 | 10 |
| | Sodium sulfate | 38 | 38 | 38 | 38 | 38 | 38 |
| | Sodium citrate | 1 | 1 | 1 | 1 | 1 | 1 |
| | PEG(5) | 1 | 1 | 1 | 1 | 1 | 1 |
| | Water | 5 | 5 | 5 | 5 | 5 | 5 |
| Properties of granular detergent | Granule strength (g/cc) | 0.025 | 0.025 | 0.025 | 0.025 | 0.025 | 0.025 |
| | Compression-caking property (kg/20 $cm^2$) | 1.3 | 1.3 | 1.3 | 1.3 | 1.3 | 1.3 |
| | Bulk density (g/cc) | 0.315 | 0.30 | 0.295 | 0.30 | 0.30 | 0.30 |

*Comparative Example
(1) Sodium alpha-olefin sulfonate having 14 through 18 carbon atoms
(2) Sodium linear alkylbenzene sulfonate having an alkyl group with 11 through 14 carbon atoms
(3) Silton having an average diameter of 1.5μ and manufactured by Mizusawa Kagaku
(4) $Na_2O/SiO_2$ = 1/2.6
(5) Polyethylene glycol having an average molecular weight of 6000

As is clear from the results shown in Table 1, Run Nos. 2 and 3 according to the present invention produced the desired granular detergent compositions having a low bulk density. Run No. 1 only produced a granular detergent composition having a high bulk density. Run Nos. 4, 5, and 6 were able to produce the granular detergent compositions similar to those of Run Nos. 2 and 3 only when the drying capacity was decreased.

EXAMPLE 2

Granular detergent compositions were produced in the same manner as in Example 1. The results are shown in Table 2 below.

TABLE 2

| | | Run No. | | | | | |
|---|---|---|---|---|---|---|---|
| | | 1 | 2 | 3 | 4 | 5 | 6* |
| Aqueous slurry | Ingredient | AOS—Na<br>LAS—Na<br>Sodium silicate<br>Sodium citrate<br>PEG | AOS—Na<br>LAS—Na<br>Sodium silicate<br>Sodium citrate<br>PEG | AOS—Na<br>LAS—Na<br>Sodium silicate<br>Sodium citrate<br>PEG | AOS—Na<br>LAS—Na<br>Sodium silicate<br>Sodium citrate<br>PEG | AOS—Na<br>LAS—Na<br>Sodium silicate<br>Sodium citrate<br>PEG | AOS—Na<br>LAS—Na<br>Sodium silicate<br>Sodium citrate<br>PEG |
| | Air bubbling time (min) | 12 | 12 | 12 | 12 | 12 | 12 |
| | Water (wt %) | 59 | 62 | 57 | 53 | 59 | 43 |
| | Addition ingredient | Sodium carbonate<br>Sodium sulfate<br>Zeolite | Sodium carbonate<br>Sodium sulfate<br>Zeolite | Sodium carbonate<br>Sodium sulfate<br>Zeolite | Sodium carbonate<br>Sodium sulfate<br>Zeolite | Sodium carbonate<br>Sodium sulfate<br>Zeolite | Sodium carbonate<br>Sodium sulfate<br>Zeolite |
| Detergent slurry | Specific gravity | 0.83 | 0.80 | 0.85 | 0.85 | 0.85 | 0.94 |
| | Air bubble diameter (μ) | 80 | 80 | 80 | 80 | 80 | 80 |
| | Viscosity (p) | 100 | 90 | 110 | 90 | 120 | 250 |
| | Water (wt %) | 40 | 40 | 40 | 40 | 40 | 40 |
| | Drying capacity (kg/hr) | 4000 | 4000 | 4000 | 4000 | 3800 | 3800 |
| Composition of granular detergent (wt %) | AOS—Na | 10 | 16 | 15 | 10 | 10 | 10 |
| | LAS—Na | 10 | 0 | 5 | 10 | 10 | 10 |
| | AES—Na(1) | 0 | 0 | 0 | 5 | 0 | 0 |
| | Zeolite | 15 | 15 | 15 | 15 | 20 | 30 |
| | Sodium silicate | 10 | 10 | 13 | 13 | 5 | 5 |
| | Sodium carbonate | 10 | 10 | 10 | 10 | 7 | 7 |

TABLE 2-continued

| | | Run No. | | | | | |
|---|---|---|---|---|---|---|---|
| | | 1 | 2 | 3 | 4 | 5 | 6* |
| | Sodium sulfate | 38 | 42 | 35 | 30 | 41 | 31 |
| | sodium citrate | 1 | 1 | 1 | 1 | 1 | 1 |
| | PEG | 1 | 1 | 1 | 1 | 1 | 1 |
| | Water | 5 | 5 | 5 | 5 | 5 | 5 |
| Properties of granular detergent | Granule strength (g/cc) | 0.025 | 0.025 | 0.03 | 0.025 | 0.02 | 0.015 |
| | Compression-caking property ($kg/20\ cm^2$) | 1.3 | 1.3 | 1.5 | 1.5 | 1.1 | 0.7 |
| | Bulk density (g/cc) | 0.295 | 0.30 | 0.295 | 0.295 | 0.305 | 0.34 |

*Comparative Example
(1)AES—Na; sodium alkylethoxy sulfate ($C_{12}$—$C_{14}$ alkyl group, $\overline{EOP}$ = 3)

EXAMPLE 3

A detergent slurry having the composition listed below was charged to an apparatus comprising a mixing vessel provided with a paddle type agitator and a circulating line provided with an air inlet and various continuous discharging machines. Air was bubbled into the slurry, through the air inlet provided with a stainless steel perforated plate having a perforation diameter of 0.1 through 1 mm and an opening space ratio of 1%, while the slurry was circulated under stirring. The resultant slurry was spray dried in a hot air spray drying apparatus. Thus, granular detergent compositions were obtained.

Composition of detergent slurry (% by weight)
AOS-Na: 6.3
LAS-Na: 6.3
Zeolite: 9.5
Sodium silicate: 6.3
Sodium carbonate: 6.3
Sodium citrate: 0.6
PEG #6000: 0.6
Sodium sulfate: 24.0
Water: 40

The various discharging machines used were as follows.

| | |
|---|---|
| Gear pump: | OHBC-150MG-31 manufactured by Daito Kogyo (discharge rate 1300 l/min, 300 rpm) |
| Pipe line homomixer: | PL-2W manufactured by Tokushu Kika Kogyo (discharge rate 1300 l/min, 3000 rpm) |
| Centrifugal pump: | EC100-26 manufactured by Nishijima Seisakusho (discharge rate 1500 l/min, 1710 rpm) |

The results are shown in Table 3 below.

TABLE 3

| | | Run No. | | | |
|---|---|---|---|---|---|
| | | 1 | 2 | 3 | 4 |
| Properties of slurry | Continuous discharging machine | Centrifugal | Gear | Line mixer | None |
| | Air bubbling time (min) | 6 | 12 | 30 | 12 |
| | Specific gravity | 0.8 | 0.95 | 0.8 | 0.95 |
| | Bubble diameter (μ) | 80 | 80 | 80 | 80 |
| | Viscosity (p) | 110 | 80 | 100 | 80 |
| | Drying capacity (kg/hr) | 4000 | 3800 | 4000 | 3800 |
| Properties of granular detergent composition | Granule strength (g/cc) | 0.025 | 0.025 | 0.025 | 0.025 |
| | Compression-caking property ($kg/20\ cm^2$) | 1.3 | 1.3 | 1.3 | 1.3 |
| | Bulk density (g/cc) | 0.295 | 0.32 | 0.295 | 0.32 |

EXAMPLE 4

Granular detergent compositions were prepared in the same manner as in Example 3, except that the centrifugal pump was used as the continuous discharging machine.

The compositions of the slurry and the results are shown in Table 4.

TABLE 4

| | | Run No. | | |
|---|---|---|---|---|
| | | 1 | 2 | 3* |
| Composition of slurry (wt/%) | AOS—Na | 6.3 | 6.3 | 6.3 |
| | LAS—Na | 6.3 | 6.3 | 6.3 |
| | Sodium citrate | 0.6 | 0.6 | 0.6 |
| | PEG #6000 | 0.6 | 0.6 | 0.6 |
| | Zeolite | 9.5 | 12.6 | 18.9 |
| | Sodium silicate | 6.3 | 3.2 | 3.2 |
| | Sodium carbonate | 6.3 | 4.4 | 4.4 |
| | Sodium sulfate | 24.0 | 25.9 | 19.6 |
| | Water | 40 | 40 | 40 |
| Properties of slurry | Specific gravity | 0.8 | 0.8 | 0.92 |
| | Bubble diameter (μ) | 80 | 80 | 80 |
| | Viscosity (p) | 110 | 130 | 300 |
| | Drying capacity (kg/hr) | 4000 | 4000 | 4000 |
| Properties of granular detergent | Granule strength (g/cc) | 0.025 | 0.02 | 0.02 |
| | Compression-caking property ($kg/20\ cm^2$) | 1.3 | 1.1 | 0.8 |
| | Bulk density (g/cc) | 0.295 | 0.30 | 0.315 |

*Comparative Example

We claim:

1. A process for producing a granular detergent composition containing a surface active agent, a zeolite, an alkali metal silicate, and other detergent builders, the content of the zeolite being 10% through 25% by weight on a dry weight basis, comprising the steps of:

(a) preparing an aqueous slurry having a water content of 45% through 80% by weight and containing, as a dispersing medium, the surface active agent;

(b) bubbling a gas into the aqueous slurry to form a slurry containing bubbles having an average bubble diameter of 40 through 100 microns and having a specific gravity of 0.7 through 0.9;

(c) mixing the resultant aqueous slurry with the zeolite, the alkali metal silicate, and the other builders to form a detergent slurry; and (d) spray drying the detergent slurry to form a granular detergent composition having a bulk density of 0.305 g/cc or less; said process providing a drying capacity of at least about 3800 kg/hr.

2. A process as claimed in claim 1 wherein the aqueous slurry into which a gas is bubbled contains the alkali metal silicate.

3. A process as claimed in claim 1 or 2 wherein the aqueous slurry is passed through a centrifugal pump prior to the mixing thereof with the zeolite and the other detergent builders.

4. A process for producing a granular detergent composition containing a surface active agent, a zeolite, an alkali metal silicate, and other detergent builders, the content of the zeolite being 10% through 25% by weight on a dry weight basis, comprising the steps of:

(a) preparing a detergent slurry containing the surface active agent, the zeolite, the alkali metal silicate, and/or other detergent builders;

(b) passing the detergent slurry through a centrifugal pump, while a gas is bubbled into the detergent slurry, whereby the detergent slurry containing bubbles having an average diameter of 40 through 100 microns and having a specific gravity of 0.7 through 0.9 is formed; and (c) spray drying the detergent slurry to form a granular detergent composition having a bulk density of 0.305 g/cc or less; said process providing a drying capacity of at least about 3800 kg/hr.

* * * * *